No. 850,205. PATENTED APR. 16, 1907.
S. R. BERGMAN.
AUTOMATIC DEVICE FOR INDUCTION MOTORS.
APPLICATION FILED MAR. 20, 1906.
2 SHEETS—SHEET 1.
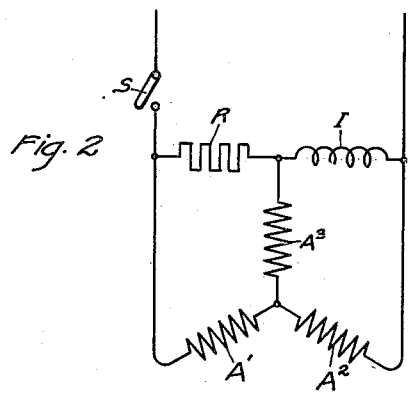
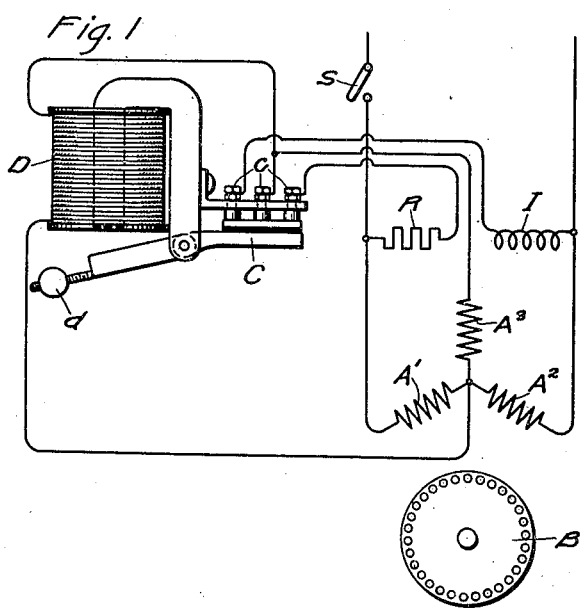
Witnesses:
Inventor
Sven R. Bergman
By
Atty.

No. 850,205. PATENTED APR. 16, 1907.
S. R. BERGMAN.
AUTOMATIC DEVICE FOR INDUCTION MOTORS.
APPLICATION FILED MAR. 20, 1906.
2 SHEETS—SHEET 2.
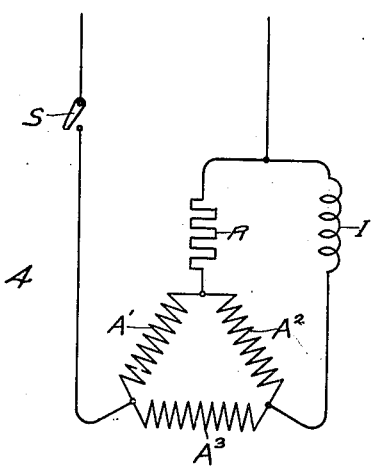
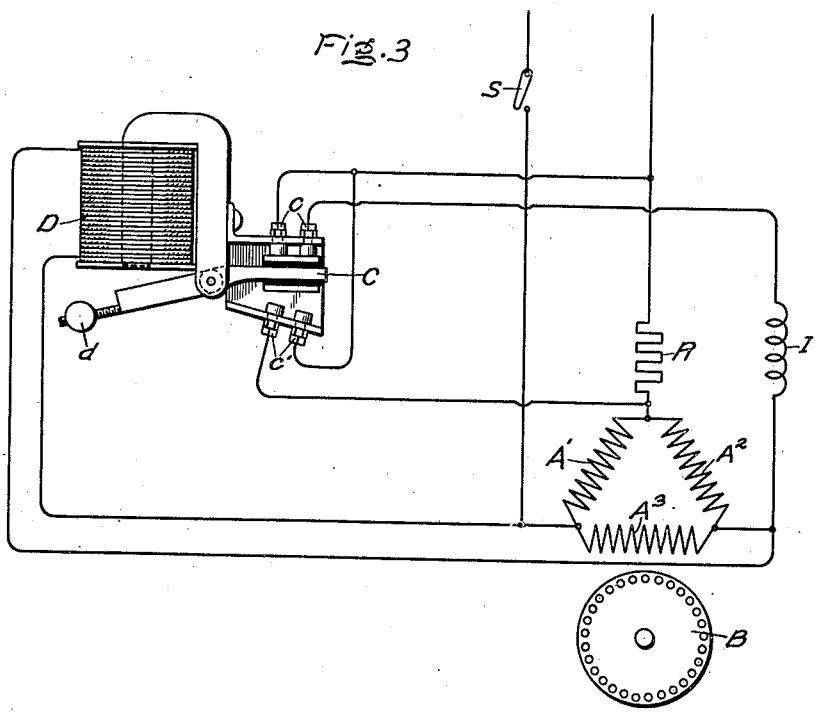
WITNESSES:
INVENTOR:
Sven R. Bergman,
By Albert G. Davis
Att'y.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

AUTOMATIC DEVICE FOR INDUCTION-MOTORS.

No. 850,205.        Specification of Letters Patent.        Patented April 16, 1907.

Application filed March 20, 1906. Serial No. 307,019.

*To all whom it may concern:*

Be it known that I, SVEN R. BERGMAN, a subject of the King of Sweden, residing at Lynn, county of Essex, State of Massachusetts, have invented certain new and useful Improvements in Automatic Devices for Induction-Motors, of which the following is a specification.

My invention relates to single-phase induction-motors of the type having different connections for starting and for running. Its object is to provide efficient and reliable means for automatically making the proper change from starting to running conditions when the motor is up to speed.

Since single-phase motors without starting devices of some sort possess no starting torque, starting-windings or phase-splitting devices, or both, are ordinarily employed with such motors. These starting devices are ordinarily not designed to carry current for any considerable length of time, and consequently must be cut out of circuit when the motor is up to speed. If this operaton is left to the attendant, the starting devices may be left in circuit because of carelessness. Furthermore, if the devices are cut out of circuit and the voltage fails, so that the motor comes to rest and the current is again thrown onto the motor, the motor will not start and may be seriously damaged by the heavy current which will flow. For these reasons it is exceedingly desirable to employ a reliable automatic device for cutting out the starting device when the motor is up to speed. For this purpose I utilize the change in the shape of the motor-field as the motor speeds up. Although at starting a cross-field exists in the motor in quadrature with the main field, due to the starting devices, this cross-field is much weaker than the main field of the motor, so that the shape of the field is elliptical. As the motor speeds up the current induced in the secondary winding strengthens the cross-field, as is well understood in the art, until when the motor is up to full speed it possesses substantially a true rotating field. In view of these facts it is obvious that any portion of the motor-winding of different phase from the portion which is connected across the source of current will be the seat of an induced electromotive force having a component in quadrature with the impressed electromotive force, which will increase as the motor speeds up, on account of the increase of the cross-field. For instance, in a single-phase induction-motor having a three-phase winding the electromotive force in the phase not connected to the source increases as the motor speed increases. I utilize this increase in induced electromotive force to operate a switch for breaking the circuit of the starting devices.

My invention will best be understood by reference to the accompanying drawings, in which—

Figure 1 shows diagrammatically a single-phase induction-motor provided with automatic controlling means arranged in accordance with my invention. Fig. 2 is a diagram of the primary circuit connections at starting. Fig. 3 shows a modification of the connections of the motor and controlling means, and Fig. 4 is a diagram of the modified starting connections.

In Figs. 1 and 2, $A'$, $A^2$, and $A^3$ represent the three phases of the winding of a single-phase induction-motor. B represents the secondary member, which may be of the short-circuited squirrel-cage type. The three phases of the primary winding are shown connected in Y, the terminals $A'$ and $A^2$ being connected to the source of current through the main switch S. The third phase $A^3$ is connected through the contacts $c$ to the phase-splitting starting device formed by the resistance R and inductance I. The contacts $c$ are connected to each other at starting by a pivoted contact member C, which is controlled by a magnet D. This magnet is connected in shunt to the phase $A^3$ of the primary winding. The pivoted contact C is provided with an adjustable counterweight $d$, arranged to return the contact to closed position when the magnet D is deenergized.

The operation is as follows: At starting the cross-field in the motor is comparatively weak, so that the induced electromotive force in the phase $A^3$ is comparatively small. Consequently the magnet D is not sufficiently energized to shift the contact member C. The motor is consequently connected for starting with the phase-splitting devices in circuit, as shown in Fig. 2. As the motor speed rises the cross-field is increased by the currents induced in the rotor, this cross-field being in quadrature to the main motor-field both in space and in time, and as the motor speed increases the shape of the field more and more nearly approaches a true rotating field. Consequently the electromotive force induced in the phase $A^3$, which electromotive force is in quadrature with the impressed electromotive force, increases until a predetermined value is reached, at which the magnet B is sufficiently energized to move contact member C to open position, thereby breaking the circuit of the starting devices. As long as the motor continues to run magnet D holds contact member C in open position; but if the motor is brought to rest for any reason—as, for instance, by a temporary failure of the current—the contact member C will be released and returned automatically to closed position by the counterweight d, so that proper connections are established for starting the motor when it is again supplied with current.

Figs. 3 and 4 show a modified arrangement of the connections of the motor and controlling-magnet. The motor-windings are shown connected in delta instead of Y, and the phase-splitting devices are shown in sereies with the motor instead of in parallel thereto. The resistance R at starting is connected in series with one motor-terminal and the inductance I in series with a second terminal, both of these terminals being connected to the same terminal of the source. When the motor is up to speed, the resistance R is short-circuited and the inductance I open-circuited, so that the phase A' is connected directly across the line. The controlling-magnet D is connected in shunt to the phase $A^3$, and the contact member C is arranged to engage the contacts c at starting and contacts c' when the motor is up to speed and magnet D draws up its armature. At starting the connections are as shown in Fig. 4; but when the contact member C bridges the contacts c' the resistance R is short-circuited and the inductance I open-circuited. With this connection of the motor and controlling-magnet it will be seen that the magnet is connected across a portion of the motor-winding which is displaced from the portion that is connected across the line when the motor is up to speed by one hundred and twenty degrees instead of by ninety degrees, as in Fig. 1. This phase displacement is sufficient, however, for proper operation, since the larger component of the electromotive force induced by phase $A^3$ is in quadrature with the impressed electromotive force, which component is proportional to the cross-field induced in the motor by the secondary currents as the motor comes up to speed.

Other modifications of the connections may be employed, and consequently I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with a single-phase induction-motor having different connections for starting and for running, a switch adapted to change said connections from starting to running conditions, a magnet-winding controlling said switch, and connections from the motor-winding to said magnet for impressing on said magnet an electromotive force substantially proportional to the cross-field produced in said motor by the secondary currents.

2. In combination with a single-phase induction-motor having different connections for starting and for running, a switch controlling said connections, and a magnet controlling said switch and connected in shunt to a portion of the motor-winding of different phase from the portion connected across the source of current.

3. In combination with a single-phase induction-motor having different connections for starting and for running, a switch adapted to change said connections from starting to running conditions, a magnet-winding controlling said switch, and connections for supplying to said magnet-winding an electromotive force proportional to the electromotive force induced in the motor-winding substantially in quadrature with the impressed electromotive force.

4. In combination with a single-phase induction-motor having a polyphase winding and different connections for starting and for running, a switch controlling said connections, and a magnet-winding controlling said switch and connected in shunt to a phase of the motor-winding not connected to the source of current.

5. In combination with a single-phase induction-motor having a three-phase winding and different connections for starting and for running, a switch controlling said connections, and a magnet-winding controlling said switch and connected between the motor-terminal not connected to the source and a neutral point.

6. In combination with a single-phase induction-motor, a phase-splitting starting device, a switch for breaking the circuit of said device, and a magnet-winding controlling said switch and connected in shunt to a portion of the motor-winding of different phase from the portion connected across the source of current.

7. In combination with a single-phase induction-motor, a phase-splitting starting device, a switch adapted to break the circuit of said device, a magnet-winding adapted to open said switch, and connections for supplying to said winding an electromotive force substantially proportional to the electromotive force induced in the motor-winding in quadrature with the impressed electromotive force, said switch being arranged to return automatically to closed position when said magnet-winding is deënergized.

8. In combination with a single-phase induction-motor, a phase-splitting starting device, a switch adapted to break the circuit of said device, and a magnet-winding adapted to open said switch and connected in shunt to a portion of the motor-winding of different phase from the portion connected across the source, said switch being arranged to return automatically to closed position when said magnet-winding is deënergized.

In witness whereof I have hereunto set my hand this 17th day of March, 1906.

SVEN R. BERGMAN.

Witnesses:
JOHN A. McMANUS, Jr.,
HENRY O. WESTENDARP.